United States Patent [19]

Esmay

[11] Patent Number: 4,571,037
[45] Date of Patent: Feb. 18, 1986

[54] FIBER OPTIC MICROSCOPE WITH ADJUSTABLE TUBE ASSEMBLY

[75] Inventor: Edward N. Esmay, Webster, N.Y.

[73] Assignee: Bausch & Lomb Incorporated, Rochester, N.Y.

[21] Appl. No.: 550,837

[22] Filed: Nov. 14, 1983

[51] Int. Cl.⁴ .............................................. G02B 21/00
[52] U.S. Cl. .................................................. 350/507
[58] Field of Search ............... 350/507, 518, 531, 529, 350/530, 247, 522, 244, 243

[56] References Cited

U.S. PATENT DOCUMENTS 2,483,897 10/1949 Godfrey ............................... 350/507
3,902,784 9/1975 Dakss et al. .......................... 350/530
4,303,299 12/1981 Clark ..................................... 350/529

Primary Examiner—John K. Corbin
Assistant Examiner—Vincent J. Lemmo
Attorney, Agent, or Firm—DeWitt M. Morgan; John S. Norton

[57] ABSTRACT

A compact portable microscope includes an optical tube assembly which is resiliently mounted therein. Adjusting members bear against the optical tube to shift the position of the objective relative to the stage. The image of the specimen being examined may, therefore, be selectively positioned within the field of view of the microscope. The optical tube assembly is also movable axially within the housing for focussing.

6 Claims, 5 Drawing Figures

FIBER OPTIC MICROSCOPE WITH ADJUSTABLE TUBE ASSEMBLY

BACKGROUND OF THE INVENTION

1. Field of the Invention

The present invention is directed toward a portable compact microscope particularly adapted for use in examining the ends of fiber optic cables.

2. Description of the Prior Art

In the field of communication with fiber optic cables, the cables must be joined at distances of approximately every three-quarters of a mile. It is imperative that the proper end connections between cables be guaranteed. Therefore, the service personnel performing the installation must be able to view the fiber optic cable ends under high magnification to ensure that they are free of optical and mechanical defects. By being able to thoroughly and closely examine the ends of fiber optic cables for proper end finish under high magnification, the chances of a faulty installation are substantially reduced.

Up until the present time, it has been the practice of those performing such inspections to employ, for instance, a conventional laboratory microscope which has been altered to hold a fiber optic cable. These altered microscopes are generally quite clumsy to handle. Consequently, the service personnel, who must often operate in less than ideal environmental and lighting conditions, are hampered in the performance of their work.

To alleviate these problems a compact and portable microscope, as set forth and described in U.S. Ser. No. 460,522 now U.S. Pat. No. 4,527,870 which was filed on Jan. 24, 1983, was developed. The subject of that invention is a compact portable microscope which may be utilized by both manufacturing and field service personnel to examine the ends of fiber optic cables. The microscope described in Ser. No. 460,522 did not, however, provide any means for adjusting the relative position of the specimen being viewed within the field of view of the microscope. This feature becomes quite necessary and, in fact, mandatory as the power of magnification is increased to, for instance, 400x and beyond.

There have been previously known devices to provide minor adjustments to an optical device as evidenced by U.S. Pat. Nos. 2,483,897, 3,476,349 and 3,962,795. However, none of the devices disclosed in these references solves the problem of providing a portable compact microscope which features an optical system which may be focussed and pivoted for optimal viewing of a specimen. The invention set forth and described hereinafter provides a solution to the problems described.

SUMMARY OF THE INVENTION

A compact portable microscope for examining the ends of fiber optic cables includes an optical tube assembly which is movable (a) for focussing upon a fixed specimen and (b) for centering the specimen in the field of view of the microscope.

The optical tube is supported in the microscope housing by a plurality of spring biasing members which bear against the optical tube assembly. A specimen support stage is affixed to the housing adjacent the objective of the optical tube assembly. A pair of adjusting members are angularly disposed to each other to bear against the optical tube assembly adjacent to the objective. The adjusting members may be moved into or away from engagement with the optical tube assembly to thereby cause it to tilt slightly within the housing. By so doing the optical axis may be shifted relative to the specimen being viewed. Centration of a specimen within the field of view may, therefore, easily be accomplished. This type of adjustment is particularly useful and necessary when powers of magnification in excess of 400x are being contemplated. The microscope detailed hereinafter provides the capability to both factory and field service personnel to easily and accurately examine the ends of fiber optic cables.

The preferred embodiment will be detailed hereinafter.

DETAILED DESCRIPTION OF THE PREFERRED EMBODIMENT

Figure 1:
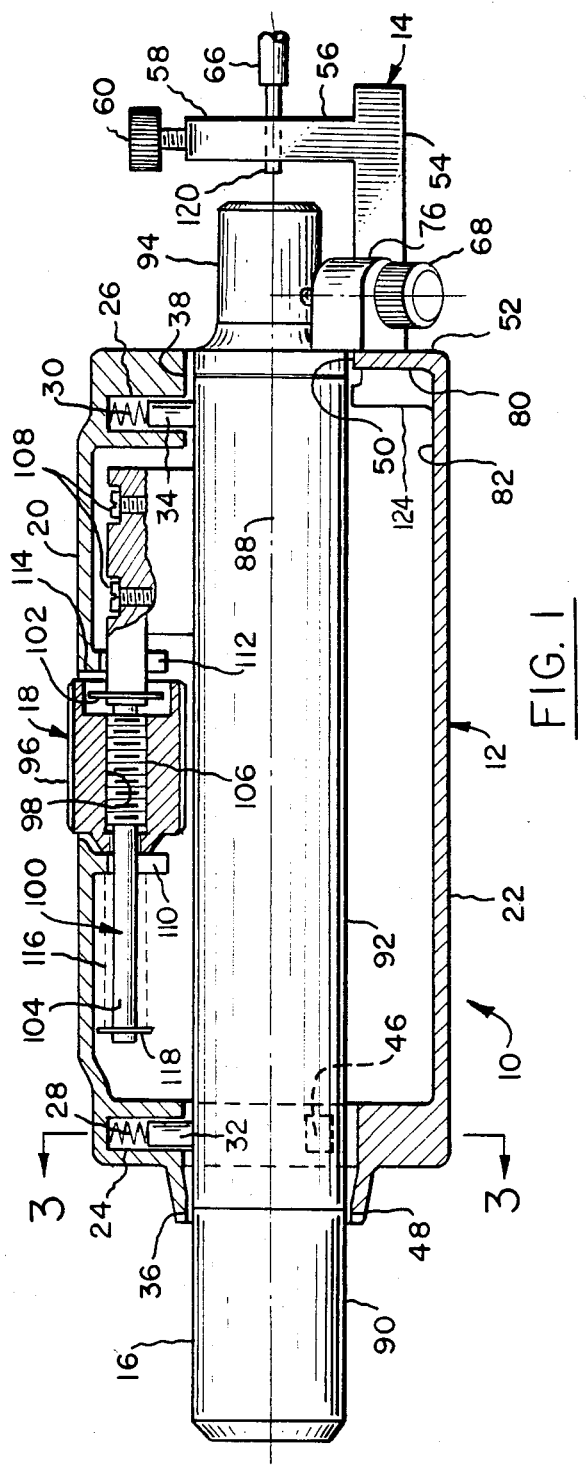
FIG. 1 is a partially sectioned side view of the compact portable microscope of the present invention.
Figure 5:
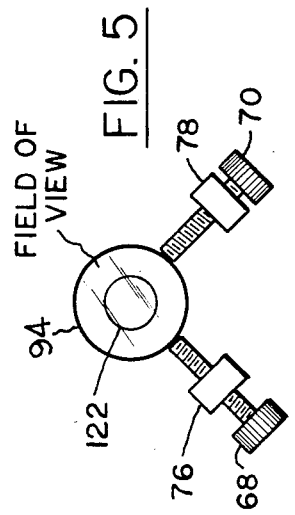
FIGS. 4 and 5 are schematic drawings of a specimen being adjusted in the field of view of the microscope.

A compact portable microscope 10 comprises a housing 12, stage assembly 14, optical tube assembly 16 and focus mechanism 18.

The housing 12 comprises an upper half 20 and a lower half 22 which are joined together in any conventional manner (not shown). As best illustrated in FIG. 1, first housing half 20 includes apertures 24 and 26 which receive, respectively, springs 28 and 30 and bearing pads 32 and 34. Housing half 20 also includes hemispherically shaped eyepiece aperture 36 and objective aperture 38.

Figure 3:
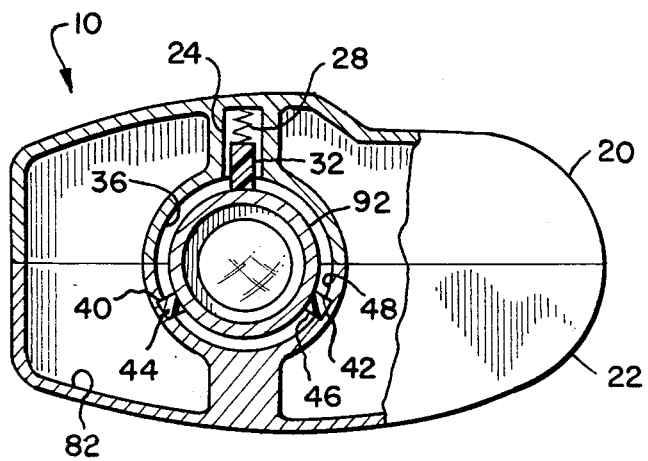
FIG. 3 is a sectional view taken along line 3—3 of FIG. 1.

Second housing half 22 includes, as best seen in FIG. 3, a pair of recesses 40 and 42 which receive, respectively, fixed support pads 44 and 46. The recesses and pads are angularly disposed to each other at, approximately, 120°. Housing half 22 also includes hemispherically shaped eyepiece aperture 48 and objective aperture 50.

Figure 2:
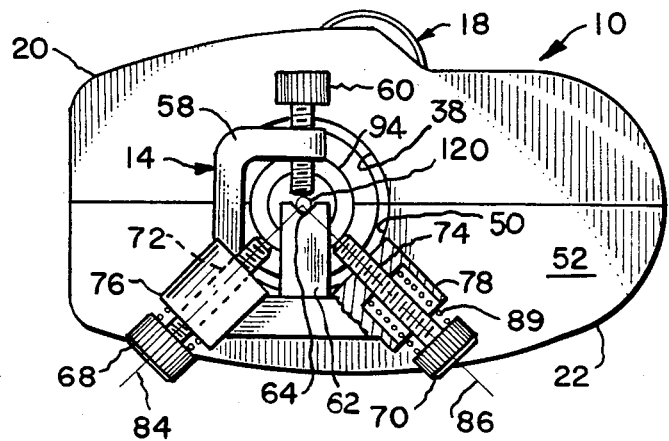
FIG. 2 is a partially sectioned front view of the fiber optic microscope shown in FIG. 1.

The stage assembly 14 is mounted to and extends from the surface 52 of housing half 22. It includes a base 54 and a specimen support fixture 56 formed perpendicular thereto. It will be seen from FIG. 2 that the support fixture 56 is similar in appearance to a C-clamp. It has a C-shaped arm 58 which carries a clamping screw 60 and a stationary anvil portion 62. The anvil 62 has a V-groove 64 for receiving and locating the end of a fiber optic cable 66.

A pair of adjusting screws 68 and 70 are received in, respectively, threaded apertures 72 and 74 of bosses 76 and 78. Although the bosses 76 and 78 are shown in the drawings as being formed on the stage assembly 14, it will be evident that they could easily have been positioned on housing half 22, either externally on surface 52 or internally on surface 80 or 82. As is evident from inspection of FIG. 2, the bosses 76 and 78 are angularly disposed with respect to each other to provide an angle of, approximately, 90°. It is also evident from the drawings that the centerlines 84 and 86 of, respectively, screws 68 and 70 intersect each other at the approximate optical axis 88 of the optical tube assembly 16.

Further, a biasing spring 89 may be fitted between the boss 78 and the adjusting screw to insure that once the screw is adjusted it will maintain that specific adjustment. The corresponding adjusting screw 68 may also feature a similar biasing spring (not shown).

The optical tube assembly 16, which is commonly referred to as a straight tube microscope, includes an eyepiece 90, tube 92 and objective 94, all disposed along optical axis 88. The eyepiece and the objective are both changeable to permit the magnification of microscope 10 to be either increased or decreased.

As is evident from FIGS. 1 and 3, that portion of tube 92 adjacent to eyepiece 90 is supported in housing 12 by spring loaded bearing pad 32 and fixed support pad 44 and 46. The objective end of tube assembly 16 rests on, and is supported by, spring loaded pad 34 and the angularly disposed adjusting screws 68 and 70. In effect, the optical tube assembly 16 is supported at both of its ends by a three-point system. As explained below, adjusting screws 68 and 70 permit the objective end of the assembly 16 to be shifted relative to the specimen being viewed.

The focussing means 18 includes a thumbwheel 96 which has an internal threaded aperture 98. An axle shaft 100 which includes focussing travel stop 102 and shaft extension 104 is fitted, via externally threaded portion 106, to the thumbwheel threaded aperture 98. The axle shaft 100 is secured by, for instance, screws 108 to tube 92 of optical tube assembly 16. The axle shaft 100 is, in turn, fitted to slotted ribs 110 and 112 of housing half 20 as best seen in FIG. 1 such that thumbwheel 96 extends partially through housing aperture 114. A coil spring member 116 is fitted about shaft extension 104 and exerts pressure between a shaft flange 118 and housing rib 110.

In operation, an optical fiber cable 66 having an end 120 is clamped in the specimen support fixture 56. The microscope is compact and light enough so that the operator may easily maneuver it into position at eye level to permit microscope examination of the end 120 of the clamped cable 66 for optical or mechanical blemishes. If the image of the cable end 120 is out of focus, the microscope operator should merely rotate thumbwheel 96 which in turn, by way of its mechanical connection to the optical tube 92, moves the entire tube assembly 16 either back or forth in the housing 12 to bring the image into sharp focus. The bearing pads 32, 34, 44 and 46 and the tips of the adjusting screws 68 and 70 are constructed from a material which has a low coefficient of friction to allow easy linear movement of the optical tube assembly 16. Also, the force exerted by springs 28 and 30 against the bearing pads 32 and 34 has been selected to insure that as little resistance as possible is offered to linear movement of the optical tube assembly 16 but, at the same time, maintains orientation of axis 88.

Figure 4:
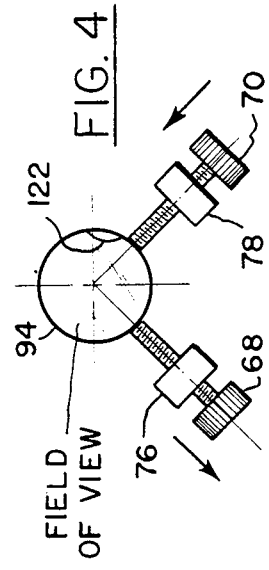

In some instances, the image 122 of the cable end may not be properly positioned within the field of view of the microscope 10, as is schematically illustrated in FIG. 4. Should this situation arise, the operator may readily center the image 122 by manipulation of the adjusting screws 68 and 70 either toward or away from the objective 94. For instance, to approximately center the image 122 seen in FIG. 4, it is only necessary to turn in screw 70 and back off screw 68. By so doing, the entire optical tube assembly is slightly pivoted about the three-point support system provided by support pads 32, 44, and 46 at the eyepiece end of tube 92. The optical tube assembly 16 is therefore, moved relative to the firmly clamped fiber optic cable 66 until the image 122 is centered. By situating the angle of the adjusting screws 68 and 70 at approximately 90° to each other and to intersect approximately the optical centerline 88, the adjustment of one adjusting screw does not impose a bind between the other adjusting screw and the objective 94.

It is evident from the description that the microscope 10 requires sufficient clearance between optical tube assembly 16 and the housing 12 in order to permit the pivoting motion described above. The diameters of the apertures formed by mating the previously mentioned hemispherically shaped apertures 36 and 48 and 38 and 50 together, are sufficiently larger than the diameter of the optical tube assembly 16 to allow such pivotal movement to take place.

A support surface 124 as best illustrated in FIG. 1 is provided to locate the optical tube assembly 16 if the adjusting screws are withdrawn from contact with the objective 94 and the objective 94 is removed to replace it with another objective of different magnification.

The foregoing description is given by way of example only and should not be considered a limitation. It is contemplated that changes and modifications may be made in the present invention without departing from the spirit or scope thereof.

What is claimed is:

1. A compact portable microscope, comprising:
    a housing;
    an optical tube assembly supported within said housing, having an eyepiece and an objective positioned along an optical axis;
    adjusting means supported by said housing and coupled to said optical tube assembly for accomplishing focussing adjustments of said optical tube assembly in directions along said optical axis; and
    means for pivoting said optical tube assembly relative to said housing including a spring biased pad member and at least one stationary pad mounted to said housing and engaging said optical tube assembly, and means operably communicating with said housing for moving said optical tube assembly relative to said housing to thereby adjust said objective relative to the position of a specimen being examined.

2. The microscope as set forth in claim 1, wherein said operably communicating means comprises at least one member adjustably supported by the housing for engagement with the optical tube assembly, whereby changing the position of the adjustable member alters the position of the objective relative to the housing and to the specimen being viewed.

3. The microscope as set forth in claim 1, wherein said operably communicating means comprises a pair of adjusting members angularly displaced with respect to each other and disposed to bear against the optical tube assembly adjacent the objective thereof, whereby adjustment of either of the adjusting members alters the position of the objective relative to the housing and to the specimen being viewed.

4. The microscope as set forth in claim 1 or 3, wherein the adjusting means comprises a first member rotatably supported by the housing and a non-rotatable second member received by the first member and coupled to the optical tube assembly, whereby rotation of the first member linearly moves the second member and optical tube assembly relative to the housing.

5. The microscope as set forth in claim 4, wherein the first member comprises an internally threaded thumbwheel at least partially disposed through the housing for ready access to an operator and the second member comprises an externally threaded shaft assembly, a portion of which is received by the threaded thumbwheel.

6. The microscope as set forth in claim 4, and further including means for biasing the second member to the housing.

* * * * *